(12) United States Patent
Knauder et al.

(10) Patent No.: US 10,921,795 B2
(45) Date of Patent: Feb. 16, 2021

(54) SYSTEM FOR MONITORING A TECHNICAL DEVICE

(71) Applicant: AVL LIST GMBH, Graz (AT)

(72) Inventors: Bernhard Knauder, Graz (AT); Halil Ziya Ahmed, Graz (AT)

(73) Assignee: AVL LIST GMBH, Graz (AT)

( * ) Notice: Subject to any disclaimer, the term of this patent is extended or adjusted under 35 U.S.C. 154(b) by 369 days.

(21) Appl. No.: 15/752,545

(22) PCT Filed: Aug. 12, 2016

(86) PCT No.: PCT/EP2016/069314
§ 371 (c)(1),
(2) Date: Feb. 13, 2018

(87) PCT Pub. No.: WO2017/025644
PCT Pub. Date: Feb. 16, 2017

(65) Prior Publication Data
US 2019/0011905 A1    Jan. 10, 2019

(30) Foreign Application Priority Data

Aug. 13, 2015   (DE) .................. 10 2015 215 513

(51) Int. Cl.
| | |
|---|---|
| *G05B 19/04* | (2006.01) |
| *G05B 23/02* | (2006.01) |
| *G05B 19/042* | (2006.01) |

(52) U.S. Cl.
CPC ..... *G05B 23/0216* (2013.01); *G05B 19/0425* (2013.01); *G05B 19/0426* (2013.01);
(Continued)

(58) Field of Classification Search
CPC ............ G05B 23/0267; G05B 23/0272; G05B 19/0426; G05B 23/0216; G05B 19/0425;
(Continued)

(56) References Cited

U.S. PATENT DOCUMENTS

| | | | | |
|---|---|---|---|---|
| 4,471,348 A | * | 9/1984 | London .............. | G05B 23/0272 324/121 R |
| 5,287,511 A | * | 2/1994 | Robinson ................ | G06F 13/28 717/106 |

(Continued)

FOREIGN PATENT DOCUMENTS

| | | |
|---|---|---|
| CN | 1527962 | 9/2004 |
| CN | 101872176 | 10/2010 |

(Continued)

OTHER PUBLICATIONS

Search Report for German Patent Application No. 102015215513.7, dated Apr. 14, 2016, 10 pages.

(Continued)

*Primary Examiner* — Kandasamy Thangavelu
(74) *Attorney, Agent, or Firm* — Sheridan Ross P.C.

(57) ABSTRACT

A system for monitoring a technical device. The system has a capturing means for reading in a first visual representation containing information regarding a setting parameter and/or a measurement parameter of a controller to control the technical device. The setting parameter and/or the measurement parameter characterizes a state of the technical device. The system may have a scanning means for detecting a symbol in the visual representation; a database for associating the setting parameter and/or the measurement parameter with the detected symbol; an interface to the controller to capture a value of the setting parameter and/or of the measurement parameter of the controller; and an image generation means for generating a second visual representation coupled to the controller such that information of the setting parameter and/or the measurement parameter is displayed with the first visual representation. The system has an image display means for presenting the generated second visual representation.

22 Claims, 5 Drawing Sheets

(52) U.S. Cl.
CPC .............. *G05B 2219/14006* (2013.01); *G05B 2219/2623* (2013.01); *G05B 2223/02* (2018.08); *Y02P 90/02* (2015.11)

(58) Field of Classification Search
CPC ...... G05B 2223/02; G05B 2219/14006; G05B 2219/2623; G05B 19/02; G06F 13/28; G06F 3/048; F02D 23/00; F02D 41/1456; Y02P 90/02; G01M 1/00; G01M 13/02; G01M 15/02; G01M 17/00
See application file for complete search history.

(56) References Cited

U.S. PATENT DOCUMENTS

| | | | | |
|---|---|---|---|---|
| 10,020,151 | B2* | 7/2018 | Prosak | G01R 31/3278 |
| 2010/0318282 | A1* | 12/2010 | Ogiso | F02D 41/1456 |
| | | | | 701/109 |
| 2010/0332017 | A1* | 12/2010 | Stummer | G05B 19/0426 |
| | | | | 700/200 |
| 2014/0303754 | A1* | 10/2014 | Nixon | G05B 23/0267 |
| | | | | 700/83 |
| 2015/0169190 | A1* | 6/2015 | Girardeau | G06F 3/04842 |
| | | | | 715/771 |
| 2015/0319510 | A1 | 11/2015 | Dellahy et al. | |
| 2016/0146130 | A1* | 5/2016 | Haskara | F02D 23/00 |
| | | | | 701/108 |
| 2016/0284128 | A1* | 9/2016 | Michalscheck | G06T 19/006 |

FOREIGN PATENT DOCUMENTS

| | | |
|---|---|---|
| CN | 104121936 | 10/2014 |
| DE | 19633870 | 2/1998 |
| DE | 19715494 | 10/1998 |
| DE | 10053665 | 5/2002 |
| EP | 1474927 | 8/2007 |

OTHER PUBLICATIONS

International Search Report prepared by the European Patent Office dated Oct. 20, 2016, for International Application No. PCT/EP2016/069314.

English Translation of International Preliminary Report on patentability for International (PCT) Patent Application No. PCT/EP2016/069314, dated Feb. 22, 2018, 10 pages.

Official Action with English Translation for China Patent Application No. 201680047887.7, dated Apr. 22, 2020, 31 pages.

* cited by examiner

SYSTEM FOR MONITORING A TECHNICAL DEVICE

CROSS REFERENCE TO RELATED APPLICATIONS

This application is a national stage application under 35 U.S.C. § 371 and claims the benefit of PCT Application No. PCT/EP2016/069314 having an international filing date of Aug. 12, 2016, which designated the United States, which PCT application claimed the benefit of German Application No. 10 2015 215 513.7 filed on Aug. 13, 2015, the disclosure of each of which are incorporated herein by reference in their entireties.

The invention relates to a system and a method for monitoring a technical apparatus, in particular a drive device, wherein a visual representation for monitoring the technical apparatus is generated and output. In particular, the invention relates to a system and a method for preparing and displaying information regarding a technical apparatus for effective processing by a user.

One example of a technical apparatus to be monitored is an internal combustion engine during the test phase and/or calibration phase (or even application phase), during which test engineers test the internal combustion engine controller for the different possible application scenarios and supply control data and determine the most optimal possible settings in a typically iterative process.

The test engineers thereby need a constant grasp of the controller's functions, in particular the control software. Therefore, the respective controller and/or control software developers usually provide documentation. During the software verification and calibration phase of a technical apparatus, the test engineers use a variety of tools on a running application. Thus, measuring devices are used on the one hand to record measured values and, on the other hand, a calibration device is used in order to access variable parameters and/or parameter fields.

In performing testing, measuring and calibration tasks, the test engineer thereby needs to consolidate information from the documentation and information provided by the calibration device or controller themselves. However, the resultant operational procedure, switching back and forth between documentation, measuring devices and calibration devices, is generally complex, confusing and time-consuming.

DE 196 33 870 A1 relates to a method for automatically generating specific production documentation for a product assembled from components based on information from the product specification and a generic representation of the product variation spectrum.

EP 1 474 927 B1 relates to a method and a system for displaying and/or viewing image streams or the effective display of same respectively. In order to improve the information received, respectively prevent physiological filtering of individual images displayed in the image stream, it is thereby provided to divide an image stream into two subset image streams and display them on a monitor simultaneously, whereby each subset image stream contains a separate subset of images from the original image stream.

DE 197 15 494 A1 relates to a method for generating operating and monitoring images for control systems, wherein an MSR scheme is broken down into individual components in the form of function elements and coupling elements, the individual function elements replaced by display elements or by suppression elements, and the display and suppression elements then recombined again with the coupling elements.

DE 100 53 665 A1 relates to an internet-based process control system for remote monitoring and control of process control procedures which can be activated from any internet-enabled computer without same needing local process-dependent installation or registration.

It is a task of the invention to simplify and improve human monitoring of a technical apparatus. A further task of the invention is to also provide improved controllability of the technical apparatus as a result of the improved monitoring.

This task is solved by a system and a method in accordance with the independent claims. Advantageous embodiments are claimed in the subclaims. By express reference, the teaching of the claims is herewith made part of the content of the specification.

A first aspect of the invention relates to a system for monitoring a technical apparatus, in particular a drive device, which comprises a capturing means, in particular an image storage means for reading in a first visual representation, in particular a signal flow diagram, wherein the first visual representation contains information regarding at least one setting parameter and/or at least one measurement parameter of a controller which is designed to control the apparatus. Furthermore, the at least one setting parameter and/or the at least one measurement parameter is suitable for characterizing a state of the apparatus. Preferably, the system also comprises a scanning means for detecting at least one symbol, in particular lettering, in the visual representation, in particular by means of optical character recognition. Furthermore, the system comprises a database for associating at least one setting parameter and/or at least one measurement parameter of the running application with the at least one detected symbol. The system preferably comprises an interface to the controller for capturing a value of the at least one setting parameter and/or the at least one measurement parameter of the controller. Further preferably, the system comprises an image generation means for generating a second visual representation, wherein the image generation means is preferably coupled to the controller such that information of the at least one setting parameter and/or the at least one measurement parameter is displayed along with at least part of the first visual representation. The first visual representation thereby preferably undergoes image processing and can differ graphically from the first visual representation as read in, in particular in color, shape and/or size of individual symbols and graphic elements. However, information conveyed by the first visual representation is preferably at least in substantial part preserved. Further preferably, the image generation means is coupled to the controller such that the value of the at least one setting parameter and/or the at least one measurement parameter is displayed along with a designation, in particular the respective detected symbol, of the at least one setting parameter and/or the at least one measurement parameter, particularly in a tabular view. Lastly, the system preferably comprises an image display means, in particular a screen, for rendering the second visual representation generated for the monitoring of the technical apparatus.

A second aspect of the invention relates to a method for monitoring a technical apparatus which preferably comprises several of the following procedural steps: Reading in a first visual representation, in particular a signal flow diagram, whereby the information related to at least one setting parameter and/or at least one measurement parameter contains an application which is designed to control the apparatus, and wherein the at least one setting parameter and/or the at least one measurement parameter is suitable for characterizing a state of the apparatus; Detecting at least one symbol, in particular lettering, in the first visual representation, in particular by means of optical character recognition; Associating at least one setting parameter and/or at least one measurement parameter with the at least one symbol detected; Capturing a value of the at least one setting parameter and/or the at least one measurement parameter of the controller; Generating a second visual representation which is coupled to the application such that the value of the at least one setting parameter and/or the at least one measurement parameter is displayed with the first visual representation, particularly in the first visual representation and/or superimposed on same, and/or Generating a second visual representation which is coupled to the application such that the value of the at least one setting parameter and/or the at least one measurement parameter is displayed along with a designation, in particular the respective detected symbol, of the at least one setting parameter and/or the at least one measurement parameter, particularly in a tabular view; and Outputting, in particular rendering, the second visual representation generated for the monitoring of the technical apparatus.

A system in the sense of the invention comprises multiple components which can be designed both as software modules and hardware modules. The components can preferably be arranged in one unit. Preferably, however, the components are distributed over several units.

A technical apparatus in the sense of the invention is an actual physical apparatus or even a simulated and/or emulated apparatus.

A visual representation in the sense of the invention is a representation which a user can visually observe, in particular a text or a graphic depiction.

A controller as defined by the invention means both a controller without a feedback of a measured variable as well as a controller with a feedback of a measured variable. The same applies to the term "control." The controller can in particular be realized by means of hardware and/or software. Preferably, it comprises a control module having at least one microprocessor, further preferably at least one data storage.

A symbol in the sense of the invention is in particular an alphabetic character, a morpheme, a word, a graphic, a logo or even metadata provided in a document as non-visible information.

Capturing means in the sense of the invention is designed so as to be able to read in a visual representation, in particular by means of a scanner, a screenshot or an optical camera.

Scanning means in the sense of the invention is designed to scan a visual representation. In particular, a software algorithm thereby processes a digital representation of the visual representation so that symbols and lettering can be detected. Preferably, optical character recognition (OCR) means are thereby used.

Image generation means in the sense of the invention can produce and/or generate a visual representation. Digital data is thereby in particular generated which can then be converted into a representation by an image display means.

An application in the sense of the invention is at least one functional part or function respectively of a software which, when run on a computer, prompts same to execute defined procedures by way of the application.

A field in the sense of the invention is a graphic element defined in a distinct area of a visual representation and exhibiting functions, in particular input and output functions, such as for example digital readability and digital reading.

The invention is in particular based on the realization that human processing of information; i.e. the cognition, recognition and processing of relevant information, plays an important role in complex man-machine systems in which information on multiple different parameters needs to be human-monitored, in particular by means of instruments, displays, control lights, etc.

Control interfaces or user interfaces of complex man-machine systems as are used to monitor technical apparatus, e.g. a drive device with an internal combustion engine, are usually structured as a line-oriented or column-oriented tabular representation. The individual parameter fields displaying the measurement parameter or setting parameter values are thereby usually identified by the names of the parameters.

A user needs to select the measurement parameter and setting parameter relevant to a specific technical procedure or a specific function from this representation on his own.

At the same time, extensive technical documentation is often available for such technical apparatus such as the drive device. Such documentation with respect to drive devices generally contains signal flow diagrams which give a user detailed information on the relevance and the functional relationship of individual parameters and functional blocks relating to a technical procedure or a specific function.

According to the invention, the letterings in the first visual representation, in particular a signal flow diagram, table, description or the like, are associated with the respective parameters and a second visual representation is generated and output which presents the user with the information of the parameter values and the first visual representation in coupled manner.

The invention hereby takes account of the information processing resource model (for example, Kahneman's single resource model, Wickens' multiple resource model), in which a basic assumption is that information processing comes at a cost of human mental capacity. This mental capacity is limited and varied among individual people as a function of many further factors. Hence, multiple activities can be performed at the same time when they do not utilize the same human resources or resource utilization can be distributed. For example, when playing the accordion, it is possible to be reading the notes and operating the keys and bellows all at the same time. Reading music relies on the visual system while operating the buttons/bellows relies on hand/arm motor function. At the same time, an accordionist can also even be walking, which takes places via his leg motor function. Driving a car in a strange city is a completely different story: The driver must thereby orientate himself as well as drive the car. Orientating oneself requires the driver to read and scroll through the map, thus utilizing both the visual system as well as the hand/arm motor function. When driving, the driver must observe traffic and steer/shift, thus also accessing his visual system and hand/arm motor function. This leads to massive human information processing conflicts, which results in a substantially increased probability of accident.

The system and method according to the invention enable the information provided by the user interfaces of the technical apparatus controller, which is displayed in run-time, particularly in online or real-time operation, to be coupled with the information on the relevant parameters and/or functional relationships, which can be taken in particular from signal flow diagrams.

By only the relevant parameter values related to the first visual representation being displayed, a user can directly access relevant information without first having to tediously extract the relevant parameters from a confusing list. By the individual relevant parameter values being displayed in the process sequence of the controller or technical apparatus respectively, the user can assess in advance the impact a parameter change will have on subprocesses and/or subsystems as well as on the total process and/or overall system and perform, at least qualitatively, a sensitivity analysis.

This substantially improves physiological human information processing since the user's visual system is now presented with data from two visual sources—which his visual system previously had to process in parallel—in just one single representation. This prevents resource conflicts during user information processing. This is particularly important when the user is subject to further sensory stimuli such as e.g. test stand noises, steering a vehicle under testing or even speaking with colleagues.

The inventive system and method provide the user with an ergonomic operating interface, respectively a user interface for a complex man-machine system such as e.g. a controller or even a calibration device for monitoring and controlling technical apparatuses. In particular enabled is the grouping and ordering of setting parameters and measurement parameters according to the respective function and the general process sequence, which makes the representation comprehensible to the user. Preferably, the parameters are spatially allocated to the respective functions in a signal flow diagram or the symbols and/or designations identifying them. This can reduce multiple interpretations, with the information being clearly allocated. These measures make the information ascertainable and/or processable for the user.

The user is preferably also presented additional information in a familiar environment, e.g. in a signal flow diagram. Information intake and/or its perceptibility is thereby increased for the user.

In particular, the inventive system and the inventive method enables, for example in vehicle development, coupling the development phase and the testing phase. Particularly the controller of an internal combustion engine hereby constitutes a complex man-machine system. Thus, a signal flow diagram which the developers outlined for a controller of an internal combustion engine to be optimized can be directly used at the test stand by the inventive system and inventive method superimposing the setting parameter and measurement parameter values over said signal flow diagram. The user, here the test engineer, can infer the functional relationship between the individual parameters directly from the generated second visual representation, draw conclusions regarding optimization of the internal combustion engine, and take the appropriate measures at the test stand, for example adjusting setting parameters, so as to achieve further optimization. The inventive system and method thus automate the generating of an interactive display and control element with which the user can interact and intuitively operate.

Complex mathematical calculations, which can—albeit not imperatively—subsequently result in generating a physical output variable, can thereby be monitored and controlled.

Particularly advantageously, interactive apparatus control can be realized directly by the inventive visual representation, with the visual representation itself becoming the control apparatus.

According to the invention, elements with complex input and output structures, such as e.g. performance maps with multiple inputs, can thereby be processed in an interactive visual representation. Functionalities of complex structure, with the control value first needing to be generated, can be stored for these elements.

Information regarding at least one setting parameter and/or at least one measurement parameter of the controller is preferably inventively captured by reading same in, in particular by scanning, taking a screenshot or recording of the first visual representation.

This enables the information to be taken directly from documentation, in particular documentation available as a digital file or in printed form. System independence is thereby achieved such that technical apparatuses can be monitored by controllers and calibration systems from many different vendors.

In one advantageous embodiment of the inventive system, at least the value of the at least one setting parameter and/or the at least one measurement parameter is displayed in its own field of the second visual representation, whereby the field is selected by the user and content, in particular the value of the at least one setting parameter, can be changed, whereby the field is coupled with the controller such that the content, in particular the value of the at least one setting parameter, can be changed in the controller.

In a further advantageous embodiment, the inventive system comprises an input means, in particular a keyboard, for inputting values for the at least one setting parameter, wherein the input means is coupled with the controller such that the value of the at least one setting parameter can be changed. This further development of the inventive system enables not only the perceiving and/or human information processing of complex man-machine system information for controlling a technical apparatus but also enables a user to make changes directly in the second visual representation as generated. This affords particularly easy and clear operation of the technical apparatus and in turn prevents resource conflicts for the user since he does not have to monitor two sources of information, for example a display of actual values and an input interface of desired values, but is instead presented with all the information on one interface. Preferably, the input means is superimposed over the image display means or a portion of the image display means, in particular a touch-sensitive input means in front of a screen or a touch-sensitive screen, so that a user can select fields and then make inputs into the system, for example using a real or virtual keyboard or voice input.

In a further advantageous embodiment of the inventive system, the controller is part of the apparatus or part of a calibration system. The inventive system and inventive method can be applied both during the representation of measured values and the programming of the direct control of the technical apparatus as well as during the indirect representation of measured values or the setting up of the technical apparatus or its control via a calibration system, for example in the case of an engine test stand, the INCA® system from ETAS GmbH. Both the control of a technical apparatus as well as a calibration system in particular constitutes a complex man-machine system.

In one further advantageous embodiment of the inventive system, the image generation means is designed such that the values of the at least one setting parameter and/or the at least one measurement parameter are displayed in spatial proximity or in place of at least one detected symbol in the second visual representation when rendered on the image display means. This embodiment of the invention actualizes the law of proximity known from the theory of human information processing, which speaks to the depicting of content-related information in direct spatial proximity. Stimuli situated close together is thereby more readily regarded as related than stimuli spaced farther apart. This embodiment of the invention further improves the intake of information, in particular the recognition of affiliations, above all relationships.

The features and advantages described above in conjunction with the invention's first aspect of an inventive system also apply with respect to the invention's second aspect of an inventive method and vice versa.

Accordingly, in one advantageous embodiment of the inventive method, the second visual representation of the application is moreover coupled such that the value of the at least one setting parameter can be changed.

Correspondingly, in a further advantageous embodiment of the inventive method, the application is also part of a control software of the apparatus or part of a calibration software for the apparatus.

In a further advantageous embodiment of the inventive method, at least the generating of a second visual representation occurs when running the application and the values captured correspond to the respectively given values. This embodiment of the inventive method enables operation during runtime of the application or the technical apparatus itself, particularly in online or real-time operation, whereby the second visual representation is regularly adapted and/or updated in the respective operational state of the technical apparatus to be monitored at a predefined periodicity.

In a further advantageous embodiment of the inventive method, as per the first aspect of the invention, the values of the at least one setting parameter and/or the at least one measurement parameter are displayed in spatial proximity or in place of at least one detected symbol.

In a further advantageous embodiment, the inventive method furthermore comprises the procedural step of extracting the at least one measurement parameter or the at least one setting parameter associated with the at least one symbol from a predefined database, in particular a mapping file. This embodiment of the inventive method applies in particular when the information on the association of multiple parameters with the symbols is stored in a database/file.

In a further advantageous embodiment of the inventive method, the at least one setting parameter and/or the at least one measurement parameter is captured at a respective interface, in particular an application or apparatus channel.

In a further advantageous embodiment of the inventive method, same furthermore comprises the following procedural step: Reading in an application control interface, in particular a type of table; and extracting the at least one setting parameter and/or measurement parameter associated with the detected symbol from the control interface; and/or extracting the set value of the at least one setting parameter and/or measured value of the at least one measurement parameter from the control interface. This embodiment of the inventive method is then particularly applicable when allocation rules between parameters and symbols are not provided in a file but rather only contained as contextual information in a documentation or a control interface of the application, in particular a complex man-machine system. This process as well substantially simplifies the intake of information for a user since he himself does not need to learn the allocation rules.

In a further advantageous embodiment of the inventive method, same furthermore comprises the procedural step of detecting a change in the at least one setting parameter and the generated second representation, in particular by user input. This procedural step enables calibrations and/or applications performed in particular in real-time to be made directly in the second visual representation.

In a further advantageous embodiment of the inventive method, changing the value of at least one setting parameter in the second visual representation effects a change of the at least one setting parameter in a control interface of the application and directly on a corresponding application or apparatus channel. As per the first aspect of the invention, calibration of the technical apparatus can thereby likewise be made directly in the second visual representation.

In a further advantageous embodiment of the inventive method, the apparatus is an internal combustion engine and the at least one setting parameter is in particular a throttle position and/or a fuel volume and the at least one measurement parameter in particular an engine speed and/or a torque of the apparatus. As is also the case with the inventive system according to the first aspect of the invention, the inventive method according to the second aspect of the invention is particularly well-suited to the optimization of internal combustion engines or drive systems respectively.

In a further advantageous embodiment of the inventive method, same furthermore comprises the following procedural step: Detecting a logic with regard to a signal flow in the visual representation; and matching the detected logic with an algorithm of the application, whereby the at least one setting parameter and/or the at least one measurement parameter is associated with the at least one detected symbol based on the match. In this embodiment of the inventive method, not only is the functional relationship between individual symbols and/or parameters taken from the first visual representation but symbols can also be automatically associated with parameters on the basis of the detected logic.

The following description yields further advantages, features and possible applications of the invention in conjunction with the figures. Shown are:

FIG. 1b a partially schematic depiction of an enlarged first visual representation from FIG. 1a;

FIG. 1c a partially schematic depiction of an enlarged second visual representation from FIG. 1a;

The invention is described based on the figures in relation to an application of the invention in calibrating an internal combustion engine 2. The invention can, however, also be used in other fields requiring monitoring of technical apparatus. One example of a setting parameter is in the described application of the throttle position, one example of a measurement parameter is in this case the engine speed or also torque of the internal combustion engine.

The process verification and calibration phase of automotive development makes use in particular of software-in-the-loop environments (SiL), hardware-in-the-loop systems (HiL), component test stands, vehicle test stands or also vehicle environments. In particular functional diagrams 4, particularly graphic signal flow diagrams, are used in this operating environment in order to be able to grasp the functional relationship between individual parameters. Process flows are thereby often used which, as described above, need to switch back and forth between documentation, measuring devices and calibration devices.

These functional diagrams 4 are mostly generated by graphical programming languages which are also used to implement functions in software. Examples include LabVIEW® and Simulink®. This so-called "model-driven engineering" has proven a highly flexible and practical approach in the software development process. The advantages of a graphical representation of functions are not, however, provided over the entire development cycle, that including the design and test phase:

In the design phase, a function definition of an application or controller 5 can be programmed in graphical form (for example with LabVIEW® or Simulink®) and tested and precalibrated in simulated environments.

In the test phase, including the calibration phase, the function only exists as machine code in a control software and is executed in a test environment, normally on a test stand 14. The machine code provided thereby usually exhibits no direct connection to the schematic representations 4 developed in the design phase.

Only the specifically defined labels of the control software parameters are normally stored in a so-called mapping file, which enables the test stand software to directly access the running application. Access then preferably ensues via a defined interface.

So-called reverse engineering of functional diagrams 4 from the control software generated by graphical programming for controller use on the test stand 14 is ruled out since this is laborious and/or not possible without specific information on the respective target platform. This cannot be realized or at the least is only difficult to realize in relation to different systems of different vendors.

Figure 1A:
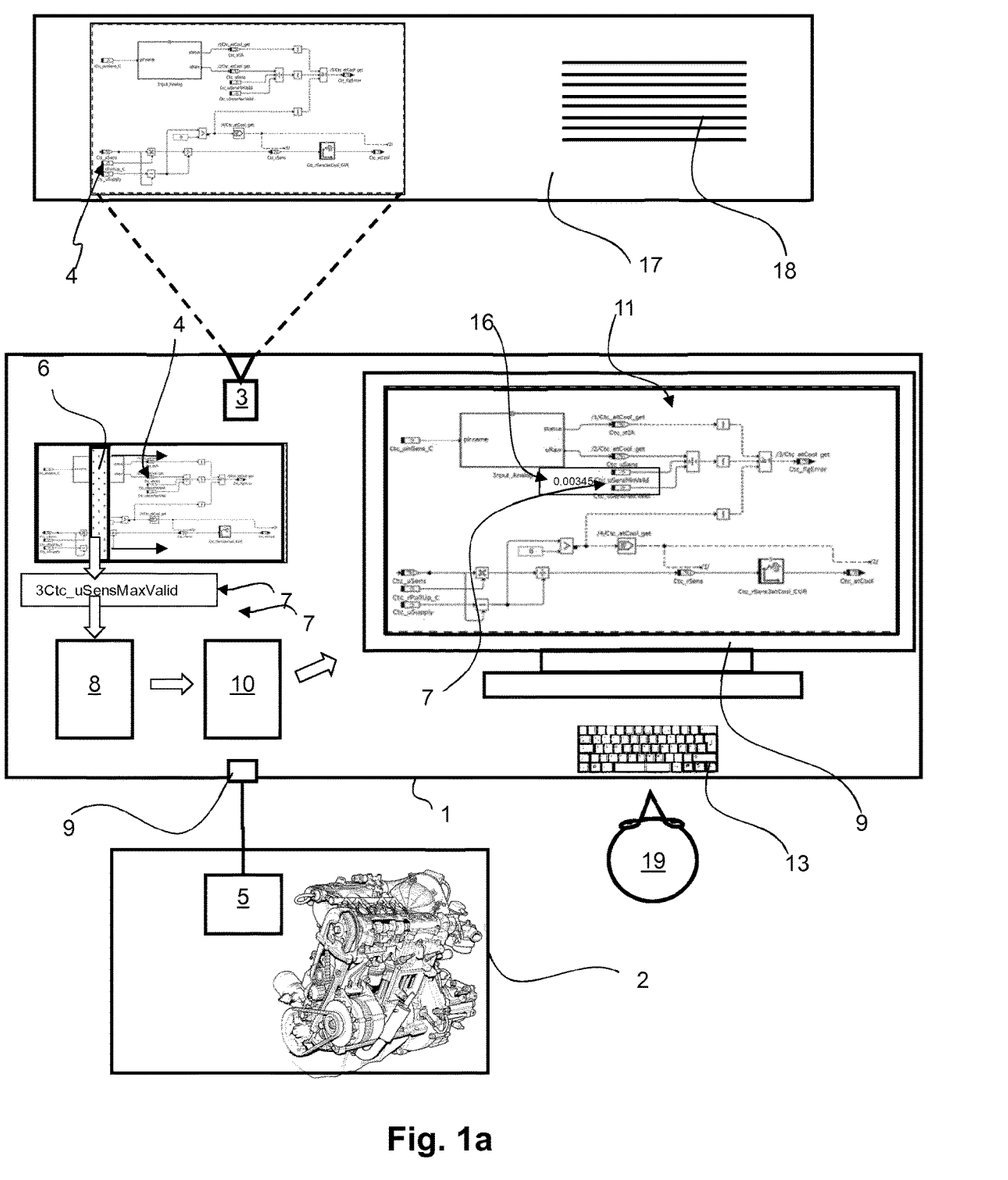
FIG. 1a a partially schematic representation of a first embodiment of a system according to the invention for monitoring a technical apparatus.

FIG. 1 depicts a first embodiment of an inventive system 1 of a technical apparatus which enables directly integrating graphical representations of the functionalities into the developer's operating procedure over the entire development cycle; i.e. not only during the development phase but also during the test phase. The functioning of this system 1 is explained based on a sequence of operations of the inventive method 100, as is depicted partially schematically in FIG. 3.

Preferably, documentation 17 is furnished together with the control software of a technical apparatus 2 which contains information on the control software and the technical apparatus 2 both as text 18 as well as a signal flow diagram 4.

The signal flow diagram 4 is preferably read in 101 by an image capturing means 3, in particular a video camera, a still camera, scanner or a screenshot device, which is part of the inventive system 1. The system 1 subsequently processes the imported signal flow diagram 4 via a scanning means 6 in order to detect 102 in particular symbols; i.e. alphabetic characters, morphemes, words, graphics, logos or even metadata in the signal flow diagram 4. Preferably, the system 1 can associate 107 each detected symbol 7, in the depicted example, the symbol "3Ctc-uSens MaxValid", to the respectively associated parameter by means of a database 8 containing information on the relationships between the parameters and the symbols.

In a further procedural step, preferably the values of the detected parameters, in particular the setting parameter and/or measurement parameter, as given in the technical apparatus 2 or its controller 5 respectively, are captured 108. The system 1 preferably comprises an interface 9 via which the system 1 can be coupled to the controller 5 for this purpose.

By means of the information now available on the signal flow diagram 4 and the parameters of the technical apparatus 2, a second visual representation 11 can be generated 109. The system 1 preferably realizes this by means of an image generation means 10, whereby the second visual representation 11 is coupled to the controller 5 or an application executed on same respectively, such that the respective values are displayed in the second visual representation 11, in particular with a running application, particularly in online or real-time operation.

The second visual representation 11 thereby preferably exhibits a similar form as the originally imported signal flow diagram 4, wherein symbols for parameters are supplemented or respectively replaced in particular by their respective values 16. This supplemented signal flow diagram 11 is preferably output 110 in a further procedural step. This preferably ensues by rendition via a screen 12 of the inventive system 1 so that a user 19 can view the supplemented signal flow diagram 11.

The parameter values 16 are preferably displayed in spatial proximity or even in place of the symbols 7 in the supplemented signal flow diagram 11. Doing so in particular ensures that the user 19 will regard a symbol 7 and/or a functional block of the signal flow diagram as being related to the correspondingly associated parameter value 16.

Further preferably, the supplemented signal flow diagram 11 is coupled to a controller 5 or an application, in particular a software of said controller 5 respectively, such that the values of the parameters displayed in the supplemented signal flow diagram 11 can be changed.

Preferably, the inventive system comprises to that end a user interface 10, in particular an input means and/or keyboard, with which the user 19 can input values into the system 1 at least for a setting parameter of the technical apparatus 2. In a further procedural step, the system 1 then captures 111 a change of the setting parameter value in the supplemented signal flow diagram 11. This preferably likewise produces an adapting of the setting parameter value in the application, the controller 5 of the apparatus 2, or the apparatus 2 itself. The signal connection or signal transmission can thereby ensue both via input into a control interface 15 of the application or can be transmitted directly via a corresponding channel.

Preferably, a parameter is associated 107 with a symbol 7 based on information stored in a database 8. From that, the parameter(s) associated with a symbol 7, in FIGS. 1*a* and 2 for example the "3Ctc-uSens MaxValid" symbol, is extracted 103*a*.

Figure 3:
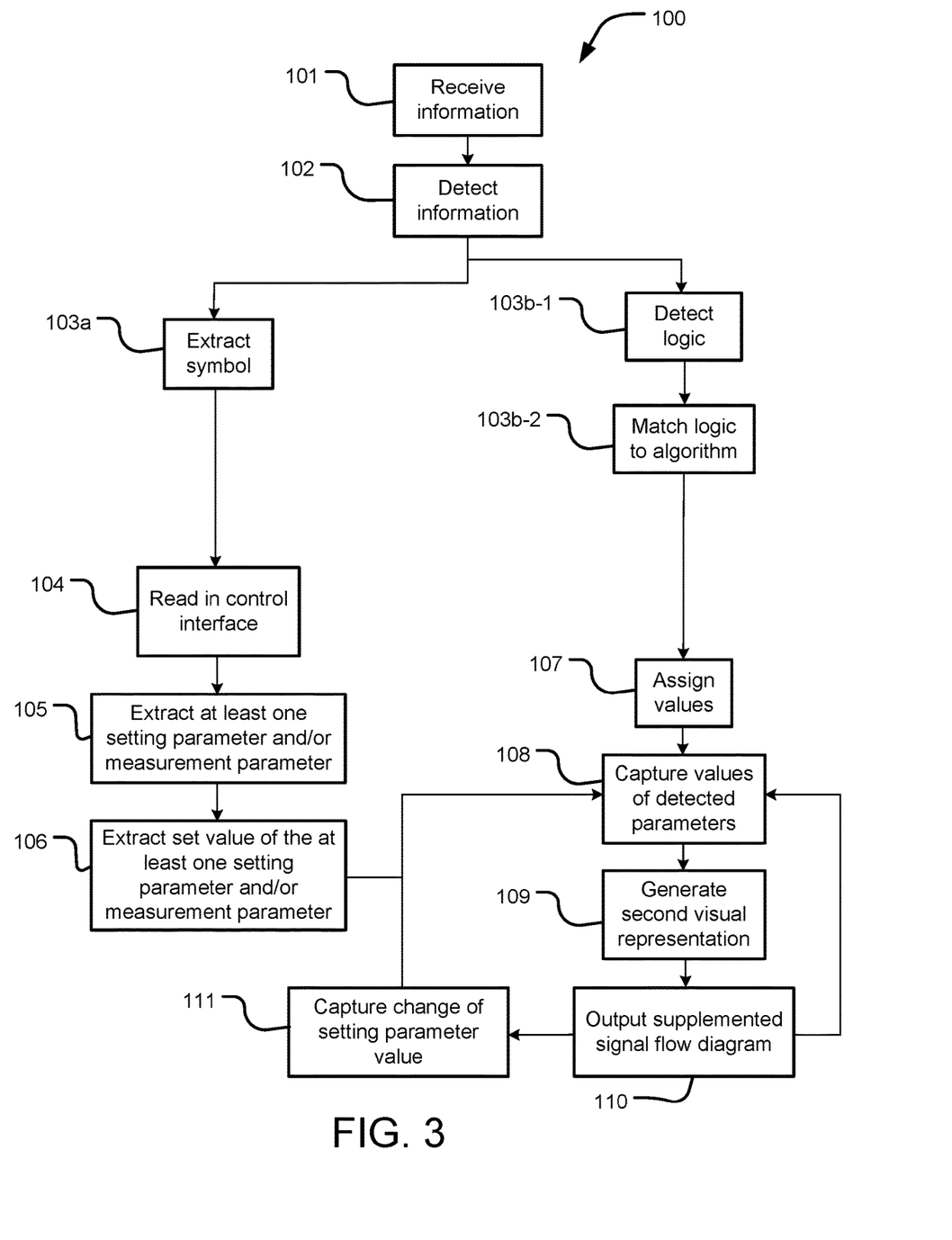
FIG. 3 a partially schematic block diagram of one embodiment of the inventive method for monitoring a technical apparatus.

Alternatively or also additionally, the system 1 can also comprise a means for detecting 103*b*-1 a logic with regard to a signal flow in the signal flow diagram 4. In a further step, the detected logic is then preferably matched 103*b*-2 to an algorithm of the application. The respective parameter of the application can thereby be linked to the associated symbol 7 in the signal flow diagram. The parameters can be allocated to the symbols 7 detected in the signal flow diagram 4 on the basis of said match 103*b*-2. The associations thereby derived are preferably stored in a database 8, preferably along with a mapping file thereto being generated.

The detected logic can in turn be used in order to depict the signal flow (for example using a bold red line) and an even better or corrected visualization of the signal flow diagram 4 thereby achieved.

If the detected logic is converted into a programming language and/or a machine code, then a subsystem able to be simulated results. Off-line testing can then be conducted and thus the function tested or setting parameters changed respectively. This corresponds to a type of reverse engineering based on the documentation.

Figure 2:
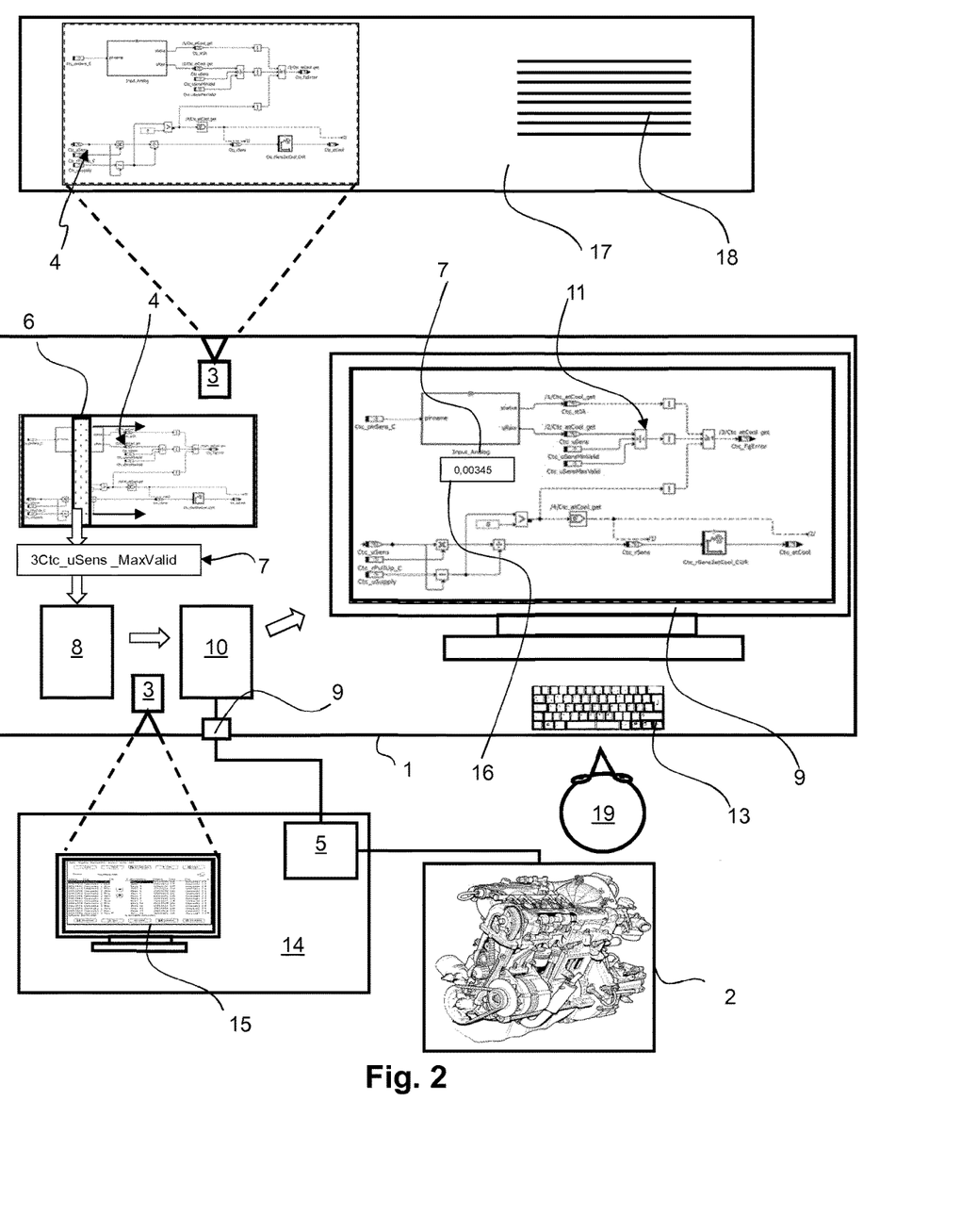
FIG. 2 a partially schematic representation of a second embodiment of the inventive system for monitoring a technical apparatus.

In the embodiments depicted in FIGS. 1a and 2, the supplemented signal flow diagram 11 is rendered on a computer screen 9, in particular on a screen of a tablet computer, a cellular phone, etc., on which the information of the signal flow diagram 4 linked to the parameter values 16 is displayed to the user 19. Preferably, the supplemented signal flow diagram 11 can also be output to another system, preferably via a further interface, by means of a transfer protocol.

The inventive method 100 is preferably repeated by the system 1 as of the procedural step of capturing the parameter values of the application or controller in order to adapt in particular measurement parameter value changes in the supplemented signal flow diagram 11. Particularly after capturing a setting parameter change in the supplemented signal flow diagram 11, for example by input of the user 19 via the keyboard 13, capturing the values of the respective parameters is initiated, in particular in consideration of the fact that, in all probability, the measured variables thereby also change upon a change in operating state of the internal combustion engine 2.

In particular possible with the inventive method 100 and the inventive apparatus 1 is the monitoring of a technical apparatus 2, preferably upon executed application, i.e. in particular during running operation or simulation, particularly in online or real-time operation, and the effecting of changes to the operation of the internal combustion engine 2.

Preferably, the inventive apparatus 1 and the inventive method 100 can alternatively or additionally read in 101 and detect 102 information from the text 18 or individual words. Corresponding symbols or words in the text can then likewise be assigned 107 values of the associated parameters in a second visual representation 11 and output and/or depicted 110.

In order to be read in, the signal flow diagram 4 or also text 18 can be in both digital form, for example a pdf document or an email, as well as also in hard copy form.

A further example application of the inventive system 1 and method 100 is with controlled systems used in simulated environments. These controlled systems are adapted to the relevant parameters in order to reflect the behavior of the real system to be modeled to the greatest extent possible. The associated process of this adaptation is also called parameterization.

Testing the model quality of a controlled system is thereby generally effected in simulated environments by subjecting the controlled system to be parameterized to appropriate stimuli via a test signal.

If a visual representation exists of a system model 4 of a controlled system, then measurement and setting parameters of the controlled system can be assigned to the system model and represented therein.

By depicting the currently measured values and setting parameters in the system model 4, internal model relationships can be better and above all more quickly grasped such that parameterization can also be accelerated here as well.

Figure 1B:
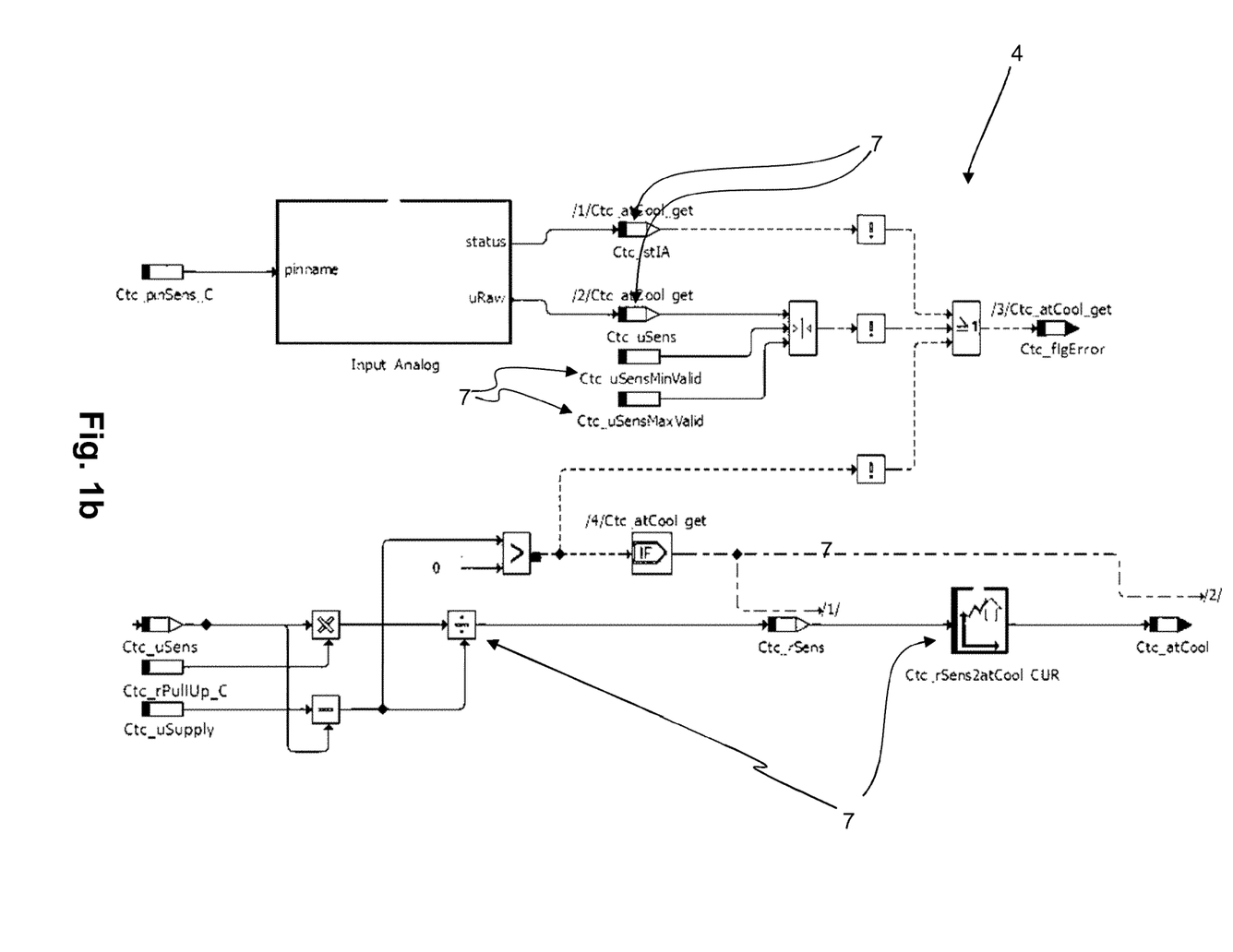

FIG. 1b shows an enlarged first visual representation 4 in the form of a signal flow diagram from FIG. 1a which also applies correspondingly to the second embodiment according to FIG. 2. Some symbols 7 have been provided with reference numerals purely as an example.

Figure 1C:
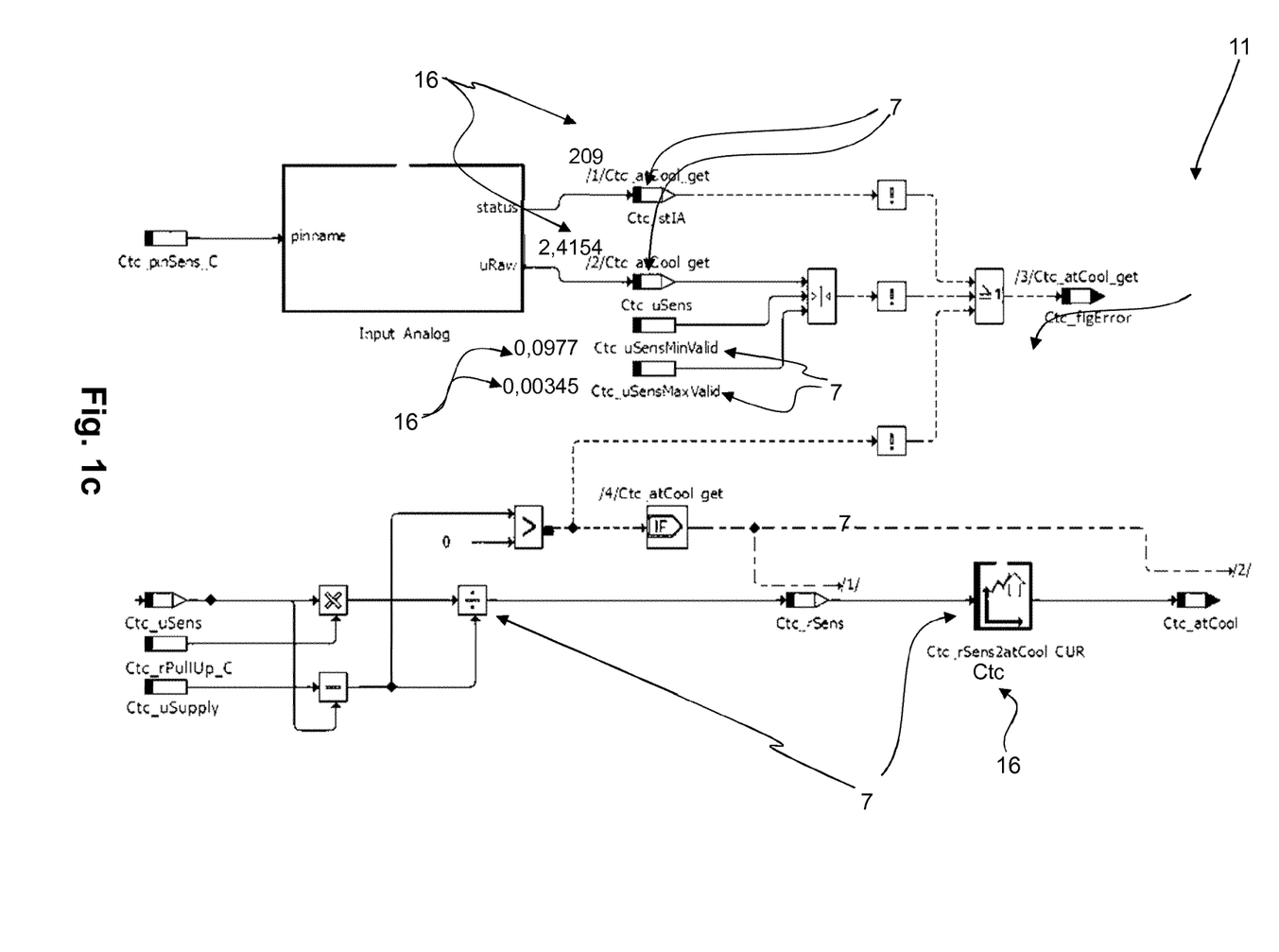

FIG. 1c shows an enlarged second visual representation 11 from FIG. 1a which also applies correspondingly to the second embodiment according to FIG. 2 and in which the signal flow diagram 4 according to FIG. 1b is at least partly depicted. Some symbols 7 and respective parameter values 16, provided there are setting parameters and/or measurement parameters for the symbol, have been provided with reference numerals purely as an example. The superimposed parameter values can be displayed with or without frames and in the same color or a different color as the signal flow diagram.

FIG. 2 shows a second embodiment of the inventive system 1 which differs from the first embodiment substantially in that the image capturing means 3, in particular a camera, not only reads in 101 the signal flow diagram 4 but it, or a further image capturing means 3, also reads in a control interface 15 of the application, as depicted in the lower part of FIG. 2. This second embodiment corresponds substantially to the lower left arm in the flow chart of the inventive method 100 in FIG. 3 which can follow both procedural step 103a as well as procedural step 103b.

In this embodiment, it is in particular assumed that the information of which setting parameter is associated with which symbol can be retrieved from the control interface 15, in particular when arranged in a line-oriented or column-oriented tabular representation. Preferably or alternatively, also the value of the parameters associated with the respective symbols, in particular setting parameters and measurement parameters, is extracted 106 from said control interface 15.

The corresponding relationships determined between symbols 7 and parameters can be stored in a database 8 in order to be used for later allocation 107. Preferably, however, the extracted values are directly captured by the system 1 and drawn on in the generating 100 of the supplemented signal flow diagram 11.

The control interface 15 can thereby be both the control software of a controller of the apparatus 2 or the apparatus 2 in itself or, as depicted in FIG. 2, part of a calibration system 14 used in the calibrating of the internal combustion engine 2 of the technical apparatus described in this embodiment.

The inventive apparatus 1 and the inventive method 100 are particularly well-suited to improving information processing in the calibration phase of the internal combustion engine 2 or, respectively, enabling easy recognition in the first place without the user 19 needing to perform additional laborious procedural steps.

LIST OF REFERENCE NUMERALS 1 system
2 technical apparatus
3 image capturing means
4 first visual representation
5 controller
6 scanning means
7 symbol
8 database
9 interface
10 image generation means
11 second visual representation
12 image display means
13 input means
14 calibration system
15 control interface
16 parameter value
17 software documentation
18 text
19 user

What is claimed is:

1. A system for monitoring a technical apparatus, wherein the system comprises:
   a capturing means for reading in a first visual representation, wherein the first visual representation contains information regarding at least one setting parameter and/or at least one measurement parameter of a controller which is configured to control the technical apparatus, and wherein the at least one setting parameter and/or the at least one measurement parameter of the controller is suitable for characterizing a state of the technical apparatus;
   a scanning means for detecting at least one symbol in the first visual representation;
   a database for associating the at least one setting parameter and/or the at least one measurement parameter of the controller with the at least one detected symbol;
   an interface to the controller for capturing a value of the at least one setting parameter and/or the at least one measurement parameter of the controller;
   an image generation means for generating a second visual representation, wherein the image generation means is coupled to the controller such that the value of the at least one setting parameter and/or the at least one measurement parameter of the controller is displayed along with at least a part of the first visual representation; and
   an image display means for rendering the second visual representation generated for monitoring of the technical apparatus.

2. The system according to claim 1, further comprising an input means for inputting value of the at least one setting parameter, wherein the input means is coupled with the controller such that the value of the at least one setting parameter can be changed.

3. The system according to claim 1, wherein the controller is part of the technical apparatus or part of a calibration system for the technical apparatus.

4. The system according to claim 1, wherein the image generation means is designed such that the values of the at least one setting parameter and/or the at least one measurement parameter are displayed in spatial proximity or in place of the at least one detected symbol in the second visual representation when rendered on the image display means.

5. A system for monitoring a technical apparatus, wherein the system comprises:
   a capturing means for reading in a first visual representation, wherein the first visual representation contains information regarding at least one setting parameter and/or at least one measurement parameter of a controller which is configured to control the technical apparatus, and wherein the at least one setting parameter and/or the at least one measurement parameter of the controller is suitable for characterizing a state of the technical apparatus;
   a scanning means for detecting at least one symbol in the first visual representation;
   a database for associating the at least one setting parameter and/or the at least one measurement parameter of the controller with the at least one detected symbol;
   an interface to the controller for capturing a value of the at least one setting parameter and/or the at least one measurement parameter of the controller;
   an image generation means for generating a second visual representation, wherein the image generation means is coupled to the controller such that the value of the at least one setting parameter and/or the at least one measurement parameter of the controller is displayed along with the associated at least one detected symbol of the at least one setting parameter and/or the at least one measurement parameter of the controller; and
   an image display means for rendering the second visual representation generated for monitoring of the technical apparatus.

6. The system according to claim 5, wherein at least the value of the at least one setting parameter is displayed in a field of the second visual representation, wherein the field is selected by a user, and wherein the field is coupled with the controller such that the value of the at least one setting parameter can be changed in the controller.

7. A method for monitoring a technical apparatus comprising the following procedural steps:
   reading in a first visual representation, wherein the first visual representation contains information related to at least one setting parameter and/or at least one measurement parameter of an application for controlling the technical apparatus, and wherein the at least one setting parameter and/or the at least one measurement parameter of the application is suitable for characterizing a state of the technical apparatus;
   detecting at least one symbol in the first visual representation;
   associating the at least one setting parameter and/or the at least one measurement parameter of the application with the at least one detected symbol;
   capturing a value of the at least one setting parameter and/or the at least one measurement parameter of the application;
   generating a second visual representation which is coupled to the application such that the value of the at least one setting parameter and/or the at least one measurement parameter of the application is displayed with at least a part of the first visual representation; and
   outputting the second visual representation as generated.

8. The method according to claim 7, wherein at least the value of the at least one setting parameter is displayed in a field of the second visual representation, wherein the field is selected by a user and the value of the at least one setting parameter can be changed, and further comprising the step:
   changing the value of the at least one setting parameter in the application when the user effects a change in the field.

9. The method according to claim 8, further comprising the step of:
   detecting a change in the value of the at least one setting parameter in the generated second visual representation.

10. The method according to claim 9, wherein a change of the value of the at least one setting parameter in the second visual representation effects a change of the at least one setting parameter in a control interface of the application or the technical apparatus.

11. The method according to claim 7, wherein the value of the at least one setting parameter can be changed in the application.

12. The method according to claim 7, wherein the application is part of a control software of the technical apparatus or part of a calibration software for the technical apparatus.

13. The method according to claim 7, wherein the generating of the second visual representation occurs when running the application and the values captured correspond to respectively given values.

14. The method according to claim 7, wherein the values of the at least one setting parameter and/or the at least one measurement parameter are displayed in spatial proximity to or in place of the at least one detected symbol.

15. The method according to claim 7, further comprising the step:

extracting the at least one measurement parameter and/or the at least one setting parameter associated of the application with the at least one detected symbol from a predefined database.

16. The method according to claim 7, wherein the at least one setting parameter and/or the at least one measurement parameter of the application is captured at a respective interface of the application or the technical apparatus.

17. The method according to claim 7, further comprising the steps:

reading in a control interface of the application;

extracting the at least one setting parameter and/or measurement parameter associated with the at least one detected symbol from the control interface; and extracting the value of the at least one setting parameter and/or the at least one measurement parameter from the control interface.

18. The method according to claim 7, wherein the technical apparatus is an internal combustion engine and the at least one setting parameter includes a throttle position and/or a fuel volume, and the at least one measurement parameter includes an engine speed and/or a torque of the internal combustion engine.

19. The method according to claim 7, further comprising the steps of:

detecting a logic with regard to a signal flow in the first visual representation; and matching the detected logic to an algorithm of the application;

wherein the associating of the at least one setting parameter and/or the at least one measurement parameter with the at least one detected symbol ensues based on the match.

20. A non-transitory computer readable medium comprising computer executable instructions for executing the steps of the method according to claim 7.

21. A processor that executes the instructions stored on the non-transitory medium of claim 20.

22. A method for monitoring a technical apparatus, comprising the following procedural steps:

reading in a first visual representation, wherein the first visual representation contains information related to at least one setting parameter and/or at least one measurement parameter of an application for controlling the technical apparatus, and wherein the at least one setting parameter and/or the at least one measurement parameter of the application is suitable for characterizing a state of the technical apparatus;

detecting at least one symbol in the first visual representation;

associating the at least one setting parameter and/or the at least one measurement parameter of the application with the at least one detected symbol;

capturing a value of the at least one setting parameter and/or the at least one measurement parameter of the application;

generating a second visual representation which is coupled to the application such that the value of the at least one setting parameter and/or the at least one measurement parameter of the application is displayed along with the associated at least one detected symbol of the at least one setting parameter and/or the at least one measurement parameter; and outputting the second visual representation as generated.

\* \* \* \* \*